A. JONES.
MACHINE FOR MAKING INLAID LINOLEUM.
APPLICATION FILED AUG. 9, 1911.

1,014,397.

Patented Jan. 9, 1912.

A. JONES.
MACHINE FOR MAKING INLAID LINOLEUM.
APPLICATION FILED AUG. 9, 1911.

1,014,397.

Patented Jan. 9, 1912.
6 SHEETS—SHEET 5.

A. JONES.
MACHINE FOR MAKING INLAID LINOLEUM.
APPLICATION FILED AUG. 9, 1911.

1,014,397.

Patented Jan. 9, 1912.

1,014,397. MACHINE FOR MAKING INLAID LINOLEUM. ALFRED JONES, Lancaster, Pa., assignor to Armstrong Cork Company, Pittsburgh, Pa., a Corporation of Pennsylvania. Filed Aug. 9, 1911. Serial No. 643,185.

*To all whom it may concern:*

Be it known that I, ALFRED JONES, a resident of Lancaster, in the county of Lancaster and State of Pennsylvania, have invented a new and useful Improvement in Machines for Making Inlaid Linoleum, of which the following is a full, clear, and exact description, reference being had to the accompanying drawings, forming part of this specification, in which—

My invention has relation to machines for making inlaid linoleum, and more particularly to that type of machine known as "straight line" machines. In this type of machines there is employed endless bands or carriers for a suitable backing of canvas or other material, and which is given an intermittent forward step-by-step feeding movement. The canvas is passed through a plurality of presses at each of which tesserae of linoleum material are cut from a sheet and are, by the cutting movement of the dies, impressed upon the canvas or other backing. The presses are arranged in tandem, one press being employed for each different color of the tesserae which are to be applied.

My invention has relation more particularly to the construction, arrangement and mode of operation of the timing mechanisms of the presses; to a novel operation of the final die members; to means of novel character for synchronizing the die plates with reference to the punches; and to certain features of the actuating and synchronizing gearing, all as more fully hereinafter described.

In the accompanying drawings, the numeral 2 designates the frame of a machine, which is mounted upon suitable foundations 3, and which preferably has a continuously extending horizontal longitudinal top or table portion 5, over which the canvas backing 6 passes, as it is carried by the feed belts or bands 7, these feed belts or bands moving in the ways 8, at the sides of the table. These belts or bands are of the usual character well known in the art. In the drawings, I have not shown the carrying wheels at one end of the machine for these bands for this reason. I have also illustrated only two of the presses in tandem, this being sufficient for the purpose of illustration, but it will be understood that any desired number may be employed.

Figure 2:
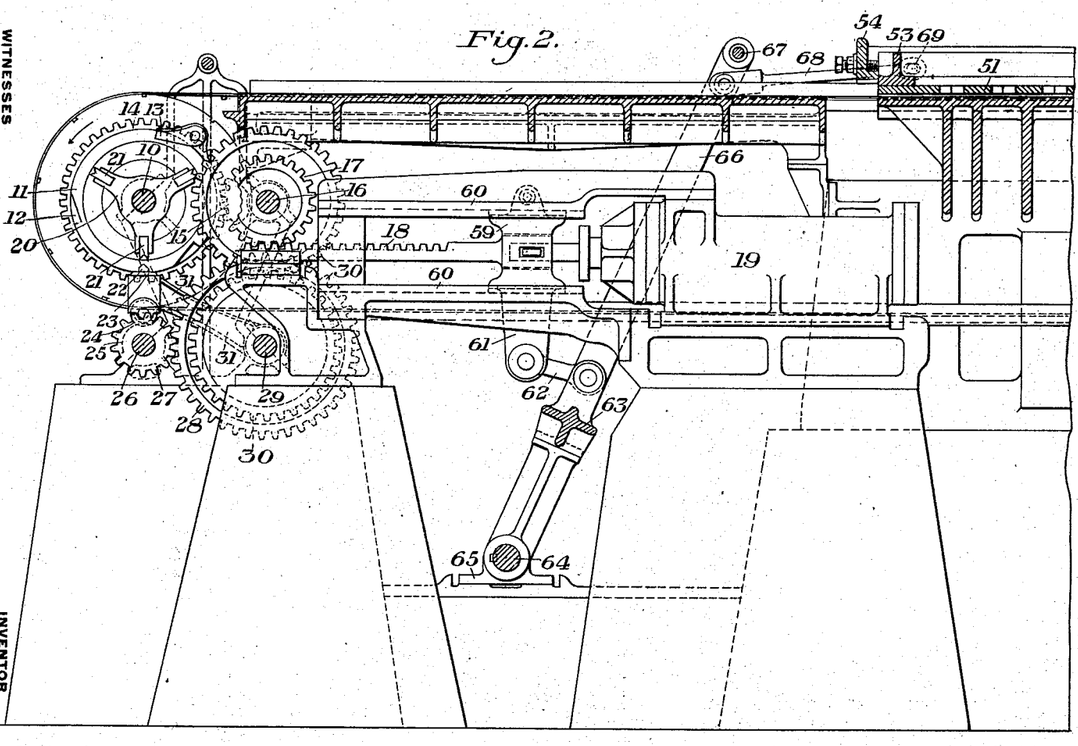
Fig. 2 is a sectional elevation of the delivery end portion of the machine, showing the synchronizing and driving mechanisms.

The carrying bands at their forward ends pass over the carrying wheels 9, one at each side of the machine, and movably mounted on a transverse shaft 10. Mounted on the shaft 10 near each end thereof is a ratchet wheel 11, the teeth 12 of which (see Fig. 2) are arranged to be engaged by pawls 13, carried on the gear wheels 14, which are loosely mounted on said shaft 10. The gear wheels 14 are driven by intermeshing gears 15, from a transverse shaft 16, this shaft 16 carrying a central gear wheel or pinion 17, whose teeth are engaged by the teeth of a reciprocating rack bar 18, connected to the plunger of a power cylinder 19.

Each forward stroke of the plunger and rack bar 18 through the gears above described effects a forward movement of the band wheels and a corresponding feeding movement of the band, the pawls 13 taking into the teeth 12. On the reverse stroke, the shaft 16 is reversed and the pawls 13 are idle, the shaft 12 remaining at rest. Mounted on the shaft 10 is a synchronizing wheel 20, having a plurality of arms, each of which carries a recessed block 21, which is adapted to be engaged by a tooth 22 on the synchronizing bar 23. This synchronizing bar carries a roller 24, which rests upon a cam 25 on the transverse shaft 26. The shaft 26 carries a pinion 27, meshing with a gear wheel 28, on a shaft 29 driven by gear connections 30 with the shaft 16. The synchronizing bar 23 is carried by an arm 31 which fulcrums on the shaft 29.

On the return stroke of the rack bar 18, the cam 25 actuates the synchronizing bar to raise the tooth 22 into engagement with one of the recesses 21 of the synchronizing wheel, thus holding the shaft 12 stationary and synchronizing the movement of the bands with the punch plates, hereinafter described, each time the mechanism is operated.

The two punch presses shown, designated respectively A and B, are similar in their character and construction, differing from each other only in the pattern and arrangement of the die plates and punches. Each of these presses comprises a press head 32, a press base 33, four vertical guide columns 34 connecting the press head and press base, and two power cylinders 35 mounted on the press head 32.

36 is a pressure plate which is connected by the pins 37 and cross heads 38 to the piston rods 39 of the cylinders 35. The pressure plate is guided in its vertical movements by the columns 34.

40 designates a punch plate having a plurality of depending punches 41 arranged to form the desired pattern. This punch plate is secured to the pressure plate 36 by means of the hangers 42, carrying adjusting screws 43, whereby lateral adjustment of the punch plate may be obtained. The punch plate 40 also has secured to its upper side a V-slide bar 44, which engages the V-slide 45, on the under side of the pressure plate 36. Distance pieces or blocks 46 are interposed between the upper side of the die plate and the under side of the pressure plate. By means of the screws 43 and the slide members 44 and 45, accurate lateral adjustment of the punch plate may be obtained.

The pressure of the punches on the tesseræ is regulated and adjusted by means of the adjustable resistance bars 47, which are secured in the pressure plate and extend upwardly through suitable guides 48, on the press head 32, and terminate at their upper ends in heads or stops 49. Each of these rods is formed in two sections connected by a turn-buckle or other adjusting device 50. By means of these turn-buckles or adjusting devices, the resistance bars may be adjusted to suit the pressure plate to different thicknesses of tesseræ, the heads 49 of said bars resting on the upper ends of the guides 48, at the termination of the downward stroke of the pistons in the cylinders 35. This prevents any distortion of the tesseræ, and at the same time, gives sufficient pressure to the punches to cause the tesseræ to adhere firmly to the backing to which they are applied.

Figure 6:
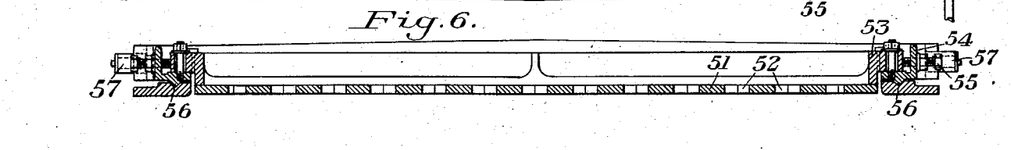
Fig. 6 is a section on the line VI—VI of Fig. 5.
Figure 7:
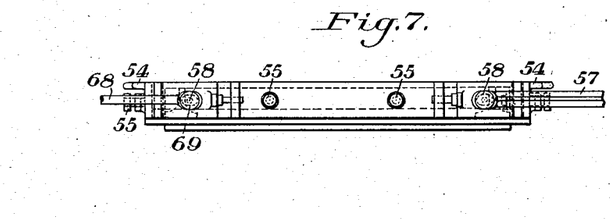
Fig. 7 is an end view of Fig. 5.
Figures 8, 9:
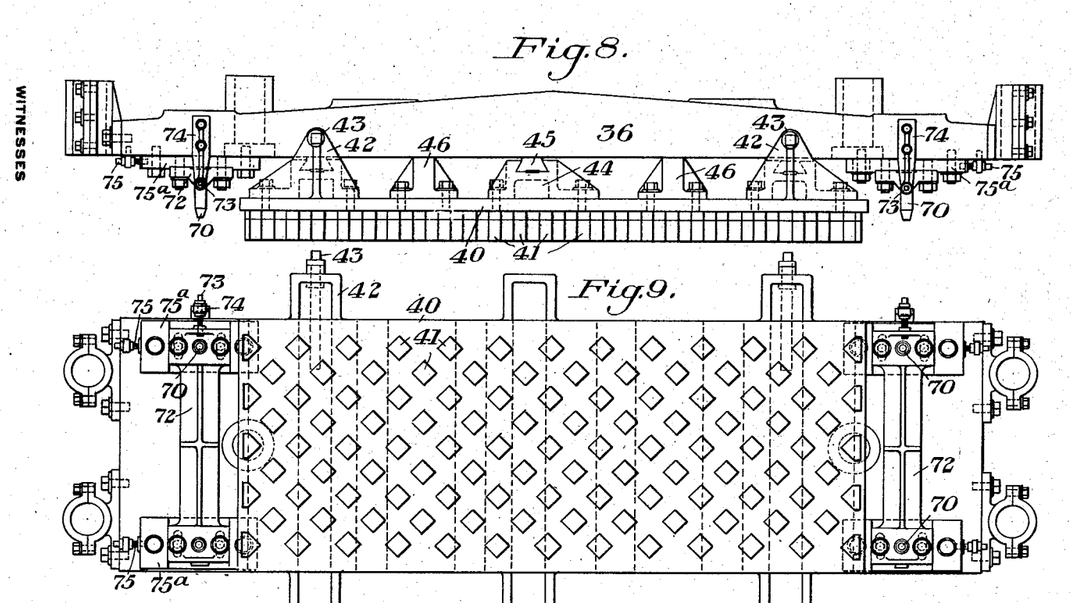
Fig. 8 is a side view of the male die and its carrier.
Fig. 9 is a bottom plan view of the same.
Figure 10:
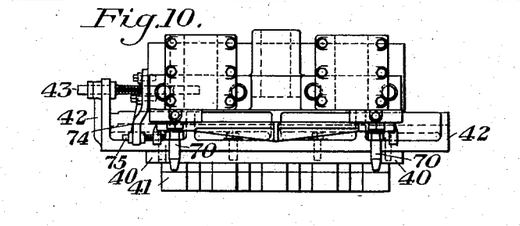
Fig. 10 is an end view.

51 (see Figs. 5, 6 and 7) designates the female die plate, which is provided with a plurality of openings 52, of the proper form and arrangement for the particular pattern being formed. The die plate 51 is removably secured to a die frame 53, which, in turn, is mounted in a die box 54. The necessary lateral and longitudinal adjustment of the die frame and die plate in the die boxes may be obtained by the manipulation of the adjusting screws 55, which are mounted in the die box and engage the sides and ends of the die frame. The die boxes are movable longitudinally on the table on the V-guides 56.

Figure 1:
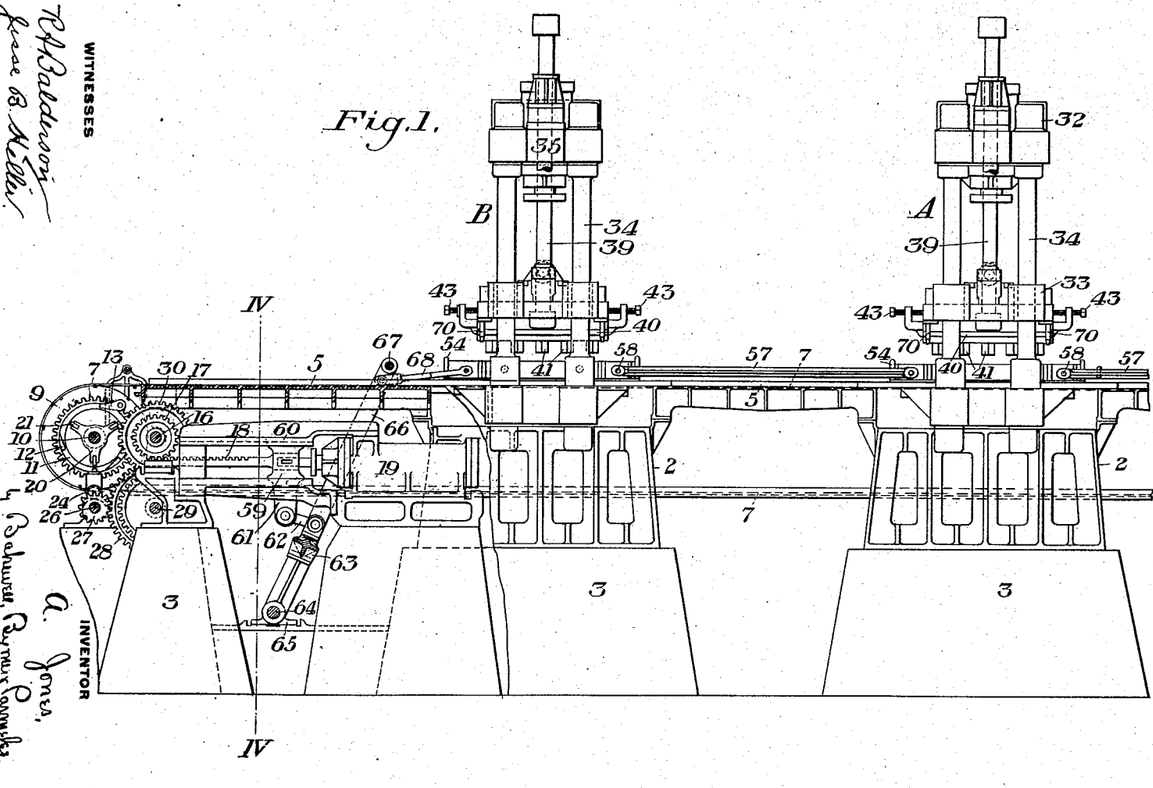
Figure 1 is a side view partly in section, showing a portion of a linoleum machine embodying my invention.
Figure 5:
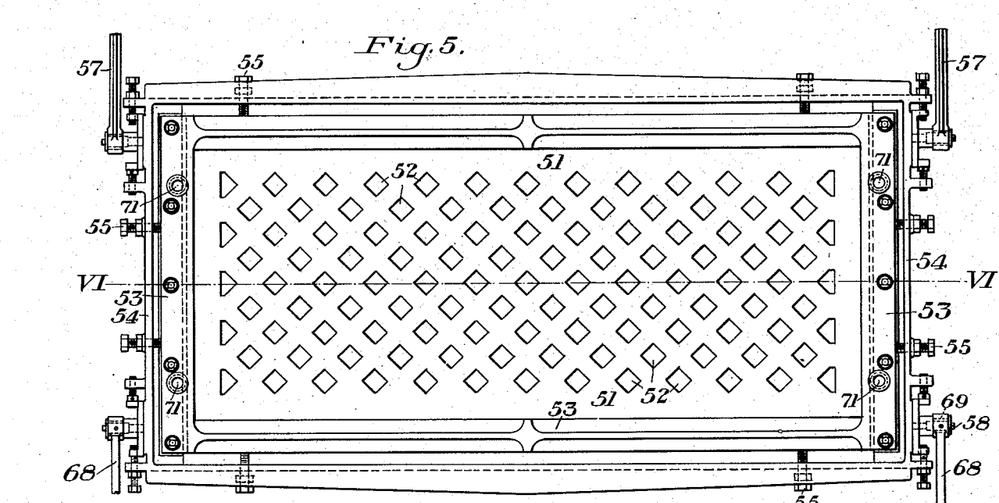
Fig. 5 is a top plan view of one of the female dies, its frame and box.

All the die boxes are connected by means of connecting rod 57, connected to pins 58 on the end members of the die box, as is shown in Figs. 1 and 5, the pins 58 being preferably made adjustable. The pin holes in the connecting rods are preferably somewhat slotted or elongated to provide for proper synchronizing or positioning of the die plates 51, as hereinafter more fully described.

In their operative position, the die boxes 54 rest under the punch plates 40 until the tesseræ have been punched through the holes of the die plates 51, the punches 41 being made to have a shearing fit in said openings. The pressure plates 36 are then raised sufficiently to allow the die boxes to be moved longitudinally from underneath said plates, so that waste composition sheets may be removed from said boxes and fresh sheets placed therein. The die boxes are then moved back to position under the punch plates and the punching operation is repeated.

Figure 3:
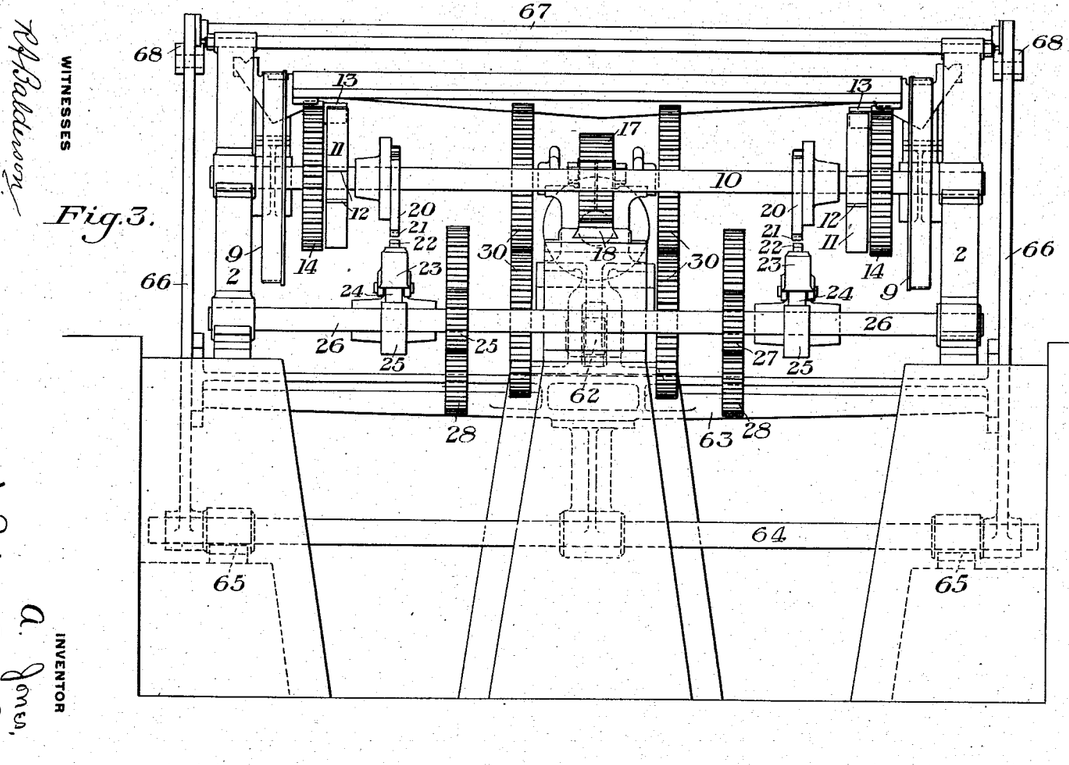
Fig. 3 is an end view of the same.
Figure 4:
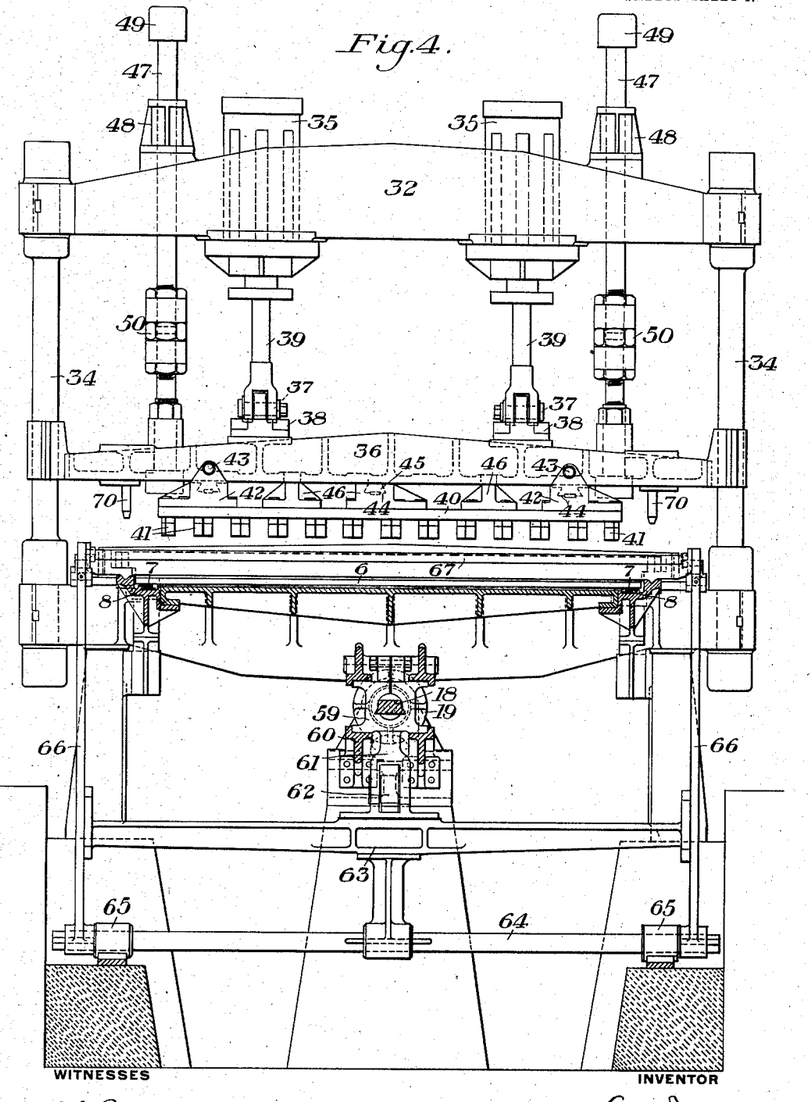
Fig. 4 is a section on the line IV—IV of Fig. 1.

The forward and return longitudinal movements of the die boxes may be effected in conjunction with the band-synchronizing motion before described, in the following manner: Rigidly secured to the piston of the plunger of the power cylinder 19 is a cross head 59, which is mounted to reciprocate between the upper and lower guides 60. This cross head has a depending fork 61 which is connected by a link 62 with the transverse beam 63, carried on a transverse rock shaft 64, mounted in suitable bearings 65, in the base of the machine. Rigidly secured to each end portion of the rock shaft 64 is a side lever 66. The two side levers 66 are connected at their upper ends above the table of the machine by a tie member 67. These levers 66 are connected with the die boxes of the adjacent press B by means of the links 68, there preferably being some play or lost motion, as indicated at 69 in Fig. 2, in the pin holes at one end of these links. The levers are also preferably secured to the beam 63, as shown in Fig. 3.

It will be readily understood that as the piston rod of the power cylinder 19 makes its forward stroke, the side levers 66 will be oscillated and moved forwardly, and through the links 68 and the connecting rods 57, the die boxes will be moved forwardly out from under the punch plates. On the return stroke of the piston, the die boxes are carried back to correct position under the punch plates, and at the same time, the carrier bands are synchronized with reference to the punch plates in the manner before described.

It is, of course, necessary that the die plates 51 shall be accurately adjusted or synchronized with respect to the punches 41. This is effected at each press by means of four synchronizing pins 70 (shown in Figs. 4, 8, 9 and 10) and which are adapted to engage corresponding holes 71 in the die frames 53 (see Fig. 5). The pins 70 are carried by synchronizing bars or plates 72, one of these bars or plates being mounted transversely at the under side of each end portion of each pressure plate 36. These bars or plates are capable of endwise adjustment by means of the adjusting screws 73, carried in the straps or brackets 74, depending from the pressure plates 36, and are capable of lateral adjustment by means of the adjusting screws 75, engaging the adjusting blocks 75ª.

The holes 71 in the die frames 53, which receive the synchronizing pins 70 are preferably bushed, and the pins are of such length that they will enter these holes just before the punches strike the composition sheets on the downward stroke of the pressure plate, this insuring the exact proper relation of the punches and die plate at each downward stroke of the pressure plate. To facilitate this, the upper ends of the openings 7 are made slightly enlarged or tapered, and it is for this purpose that there is a slight amount of play at the points of connection of the connecting rods 57 and the links 68.

It is believed that the operation of the machine will be readily understood from the foregoing description. The canvas, burlap, or other backing is fed by the bands through the machine in the ordinary manner from a suitable source of supply, forming no part of the present invention and not shown. It is given a step-by-step forward movement by the mechanism described, and while at rest, the portions thereof underneath each press have applied thereto tesseræ of the desired color, pattern, etc., the tesseræ being cut by the punches from the sheets placed in the die boxes 54, and forced through the openings 52 of the die plates 51 and impressed into permanently adhering contact with the foundation fabric. The pressure plates and punch plates are then elevated, the die boxes moved forwardly to permit the waste sheets to be removed and fresh sheets placed therein, and are again moved backwardly underneath the punch plates in proper position for another operation, the foundation fabric having been advanced the proper distance in the meantime.

It will be understood that the power cylinders which operate the pressure plates and also the power cylinder 19 are provided with suitable controlling valves in the manner well known in the art and which forms no part of the present invention. These control valves are usually of automatic character and control the operations of the cylinders in correct relationship to each other.

The advantages of my invention will be readily understood by those familiar with previously existing machines in this art. The parts are simple in their construction, arrangement and mode of operation; proper synchronizing of the parts is insured whereby accurate inlaid pattern work may be obtained; the die boxes and plates are automatically moved into position to permit the waste composition sheets to be removed and new sheets inserted and are then automatically returned and synchronized with relation to the punches; the die plates are supported closely adjacent to the upper surface of the machine table and can be made of sufficient thickness to prevent undue springing; and the die plates and punch plates can be readily removed and replaced by others for changes in pattern, etc.

It will, of course, be understood that the machine herein shown and described is susceptible of various changes in detail, without departing from the spirit and scope of my invention. Thus, any suitable band-feeding and synchronizing gearing may be employed, the connections for operating the die boxes may be changed, the construction of the presses may be varied, and various changes may be made in the details of construction and arrangement of the dies, the die frames, the die boxes and the punch plates.

It will be understood, of course, that the fabric after passing through the last punch press, is carried through a finishing press of the usual character and to a suitable take-up mechanism. As these form no part of my invention, they are not shown nor described.

I claim:

1. In a straight-line linoleum-machine, the combination with a plurality of punch presses arranged in tandem, or die boxes movable longitudinally with respect to the punches of the presses, and means for mechanically moving said boxes when the punches are raised, substantially as described.

2. In a straight-line linoleum-machine, the combination with a plurality of punch presses arranged in tandem, of a longitudinally movable die box for each press, connections between the boxes, and means for automatically moving the boxes underneath and from under the punches at the proper time, substantially as described.

3. In a straight-line linoleum-machine, the combination with a plurality of punch presses having vertically reciprocating punches, of connected die boxes movable longitudinally underneath the punches, and means for mechanically moving said boxes in timed relation to the movements of the punches, substantially as described.

4. In a straight-line linoleum-machine, the combination with a plurality of punch presses arranged in tandem, of connected die boxes movable longitudinally underneath the punches, means for moving said boxes in timed relation to the movements of the punches, and means for synchronizing the boxes with respect to the punches, substantially as described.

5. In a straight-line linoleum-machine, the combination with band mechanism for intermittently feeding the foundation fabric, of a vertically reciprocable punch plate mounted above the fabric, a die plate movable longitudinally over the fabric below the punch plate, and connections between said punch plate and the feeding mechanism for the fabric, substantially as described.

6. In a straight-line linoleum-machine, the combination with band mechanism for intermittently feeding the foundation fabric, of a vertically reciprocable punch plate mounted above the fabric, a die plate movable longitudinally over the fabric below the punch plate, and connections between said punch plate and the feeding mechanism for the fabric, together with means for automatically correctly positioning the die plate with respect to the punch plate, substantially as described.

7. In a straight-line linoleum-machine, the combination with mechanism for intermittently feeding the foundation fabric, a power cylinder for actuating the same, a vertically movable punch carrier, a longitudinally movable die member arranged to reciprocate above the fabric and below the punch carrier, and connections operated by said cylinder in timed relation to the movements of the fabric and of the punch carrier for actuating the die plate, substantially as described.

8. In a straight-line linoleum-machine, the combination with a bed or table, means for intermittently feeding the foundation fabric thereover, and a longitudinally movable die member arranged to reciprocate above the fabric, of a punch press mounted above the table, said press having a vertically movable pressure head, guides for said head, a punch plate carried by the head, and means for limiting the downward movement of said head, substantially as described.

9. In a straight-line linoleum-machine, the combination with a frame having a table over which a foundation fabric can be fed, of a die box longitudinally movable over the table, a punch press mounted over the table and having power cylinders, a pressure plate connected to the pistons of said cylinders, guides for said plate, a gang punch plate adjustably supported over the pressure plate, and means for limiting the downward movement of the pressure plate and punch plate, substantially as described.

10. In a straight-line linoleum-machine, the combination with a frame having a stationary table, a longitudinally movable die member and means for intermittently feeding the foundation fabric over the table and over said die member, of a punch press above the table having power cylinders, a pressure plate connected to the pistons of said cylinder, and a punch plate adjustably secured to the pressure plate, substantially as described.

11. In a straight-line linoleum-machine, the combination with a frame having a table and means for intermittently feeding the foundation fabric thereover, of a die box movable longitudinally on said table, a die plate in said box, a vertically reciprocating punch plate above the die box, a carrier therefor, and coöperating positioning means carried by the die box and the punch carrier, substantially as described.

12. In a straight-line linoleum-machine, the combination with a frame having a table and means for intermittently feeding the foundation fabric thereover, of a die box movable longitudinally on said table, a die plate in said box, a vertically reciprocating punch plate above the die box, a carrier therefor, and coöperating positioning means carried by the die box and the punch carrier, said positioning means comprising coacting pins and sockets, substantially as described.

13. In a straight-line linoleum-machine, the combination with a frame having longitudinal ways or guides thereon and a punch press above the frame, of a die box mounted in said ways and movable longitudinally into and out of position underneath the punch press, and means for insuring the correct positioning of said box substantially as described.

14. In a straight-line linoleum-machine, the combination with a frame having a table and means for feeding the foundation fabric intermittently over said table, said table having longitudinal ways thereon, connected die boxes movable on said ways, and mechanism for operating said boxes in timed relation to the operations of the punch and for insuring the proper positioning of the die boxes with respect to the punch press, substantially as described.

15. In a straight line linoleum machine, the combination with a frame having longitudinal ways or guides thereon and a punch press above the frame, of a die box mounted in said ways and movable longitudinally into and out of position underneath the punch press, and means for insuring the correct positioning of said box, together with a perforated die member adjustably supported in the die box; substantially as described.

16. In a straight-line linoleum-machine, the combination with a frame having a table and means for intermittently feeding the foundation fabric thereover, of a punch press above the table, said press having a vertically movable head, a gang punch carried by said head, vertically extending resistance rods connected to said head and having stop means, and means for adjusting said rods, substantially as described.

17. In a straight line linoleum machine, the combination with band wheels for feeding the foundation fabric, of a power cylinder, a gearing actuated by said cylinder for actuating the band wheels in one direction only, means for holding the band wheels stationary during their periods of rest, a longitudinally movable die box, and connections also operated by said cylinder in timed relation to the movements of the band wheels for effecting the movement of the die box, substantially as described.

18. In a straight line linoleum machine, the combination with a longitudinally movable die box, of a vertically movable punch carrier, and positioning devices for said parts, said devices comprising a plurality of pins adjustably mounted on the die carrier and adapted to engage sockets or openings in the die box, substantially as described.

In testimony whereof, I have hereunto set my hand.

ALFRED JONES.

Witnesses:
T. L. SUTER,
C. F. HUMPHREYS.